Nov. 13, 1928.

W. H. MUZZY 1,691,730

GASOLINE GAUGE

Filed May 23, 1921

Inventor
William H. Muzzy

Nov. 13, 1928.
W. H. MUZZY
1,691,730
GASOLINE GAUGE
Filed May 23, 1921    2 Sheets-Sheet 2
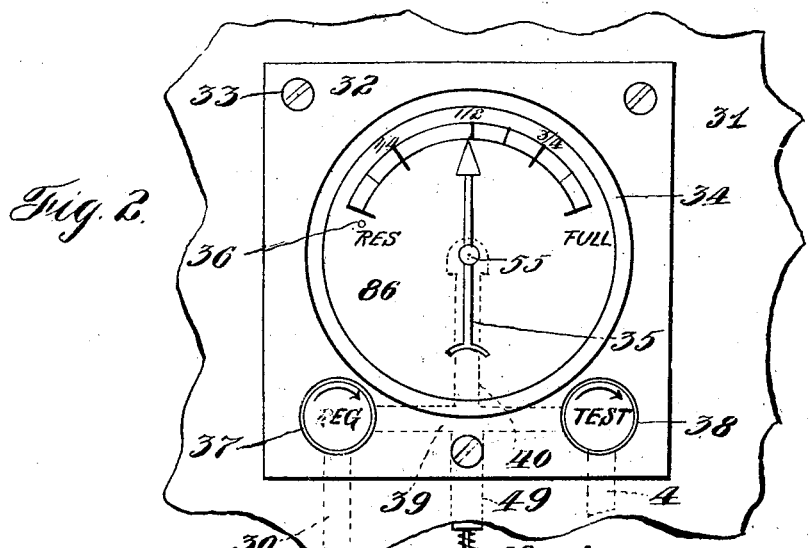
Fig. 2.
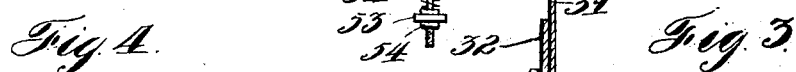
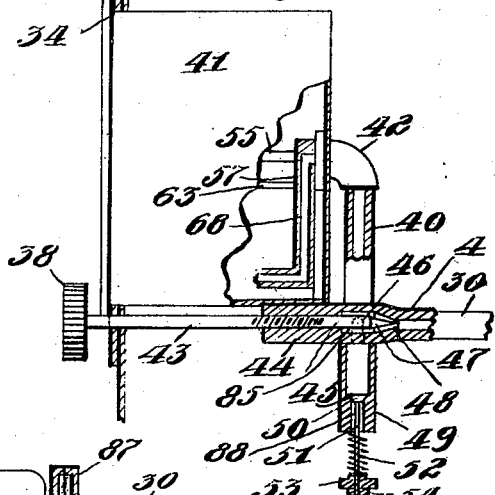
Fig. 3.
Fig. 4.
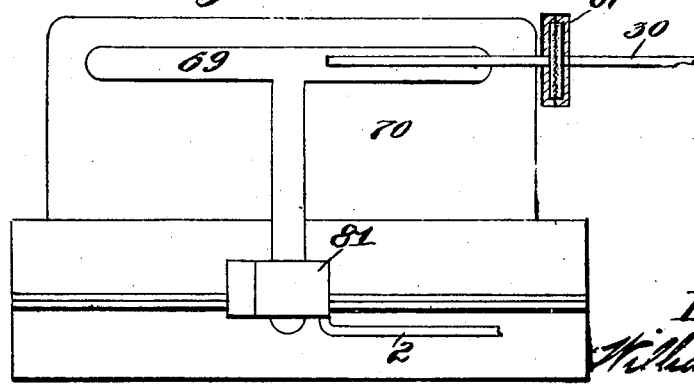
Fig. 5.
Inventor
William H. Muzzy Patented Nov. 13, 1928.

1,691,730

UNITED STATES PATENT OFFICE.

WILLIAM H. MUZZY, OF CHICAGO, ILLINOIS, ASSIGNOR TO STEWART-WARNER SPEEDOMETER CORPORATION, OF CHICAGO, ILLINOIS, A CORPORATION OF VIRGINIA.

GASOLINE GAUGE.

Application filed May 23, 1921. Serial No. 471,780.

This invention relates to improvements in systems and devices for measuring or gauging liquids and has more particular relation to improvements in devices for gauging or indicating the depths of liquids at a distance from the storage tank, especially in connection with automobiles.

One of the principal objects of the invention is to utilize the vacuum or suction created by the regular operation of the engine of the automobile to indicate at the dash of the machine the amount of gasoline in the tank at the rear of the machine.

A further object of the invention is to so construct the parts that a substantial amount of vacuum is retained for operating a commercial instrument and this amount gauged by the depth of the fuel in the tank.

Another object of the invention is to provide improved devices for preventing liquid fuel from being drawn from the fuel tank to the engine while operating the gauge by vacuum.

Still another object of the invention is the provision of devices for operating a measuring gauge from a variable source of vacuum by interposing devices for causing the vacuum to be practically constant within certain measuring limits.

Another object of the invention is to operate a vacuum gauge by a vacuum controlled by an atmospheric air controlling valve or pin which in turn is positioned by the liquid being gauged.

The invention also has other objects all of which will be hereinafter more particularly set forth and claimed.

In the accompanying drawings forming part of this specification;

Figure 2 represents a detail front elevation of the dash gauge and attachments;

Figure 3 represents a side elevation, partly in section, of the same;

Figure 4 represents a vertical transverse section through the gauge, looking forward, and;

Figure 5 represents a detail side elevation of the gas engine with the vacuum pipe attached.

Figure 1:
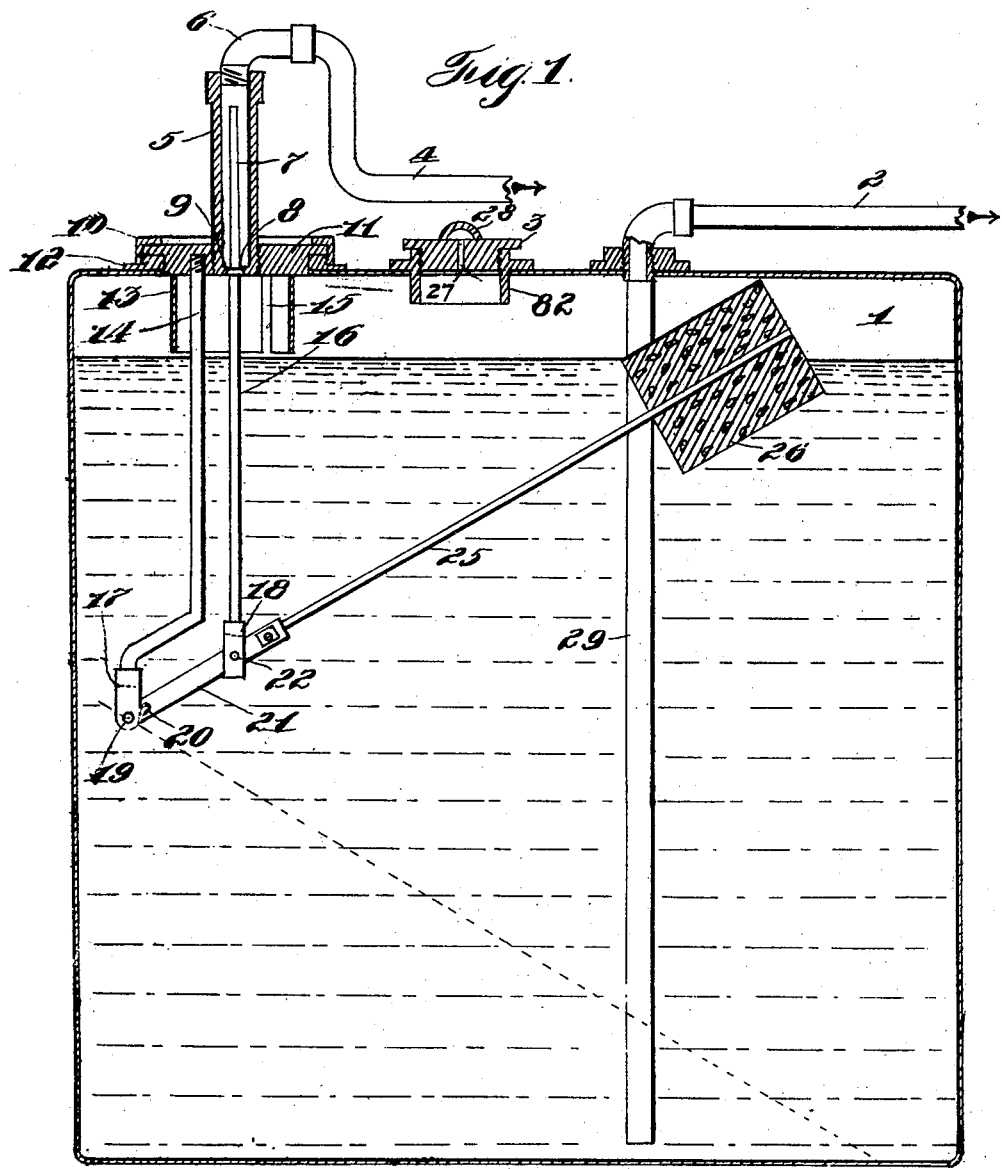
Figure 1 represents a vertical transverse section through a fuel storage tank of an automobile, with my improvements applied thereto.

The present invention is an improvement on the devices and system shown in my pending application No. 331,851, filed Oct. 20 1919.

In the accompanying drawings, 1 represents a gasoline tank, located as is usual, at the rear of the machine and connected with the carbureter of the engine 70 by pipe 2; a suitable fuel feeding system being interposed in the pipe, this being old and well known in the art and forming no part of the present invention. The tank 1 is also provided with a filler plug or cap 3 having an air vent 27, which latter is protected by an air dome having an air vent 28. By this means atmospheric pressure is freely admitted to the tank 1 while preventing water or dirt entering.

The cork float 26 is fast on the end of a rod 25 which is secured to a lever 21, the juncture being preferably soldered for safety. The lever 21 is pivotally mounted in a bifurcated lug 17 by a pin 19 which passes through an enlarged aperture formed in the lever as at 20. The lug 17 is secured to the lower end of a rigid rod 14 which is mounted in a disk 11. This disk is secured in position on top of the tank 1 by a screw-threaded flanged ring 10 that engages a screw-threaded ring 12 brazed or otherwise secured to the top of the tank; a suitable aperture being cut in the top of the tank at this point. By this structure, the whole apparatus may be readily removed from the tank when desired by simply removing the ring 10. A valve casing 5 is screwed into the disk 11 and is formed with a valve seat 9 against which a conical valve 8 is adapted to seat and be held seated by suction and the buoyancy of the float 26 when the gasoline is at the level shown in Figure 1. The valve 8 is fast on a rod 16 which is provided with a bifurcated lug 18 which straddles the lever 21 and is pivotally connected thereto by a pin 22. The rod 16 is tapered or graduated in cross sectional area to measure or control the amount of air which passes through the valve seat opening 9. The taper is from the valve decreasing toward the end of the rod so that the rod has its greatest diameter at the valve and its smallest diameter at its end.

As the float 26 rises and falls with the gasoline the metering portion 7 of the rod is drawn through the aperture of the valve seat 9 more or less and thus correspondingly opens or closes the aperture more or less according to the depth of the gasoline in the tank. The pivot pin 19 is arranged midway of the depth of the tank so that the lever 21 will be operated with an equal pivotal movement above and below the midway, half full position. The lower end of the rod 16 would normally tend to move slightly out of the same vertical plane, shown in Figure 1, when in the half way or intermediate position, but this operation is counteracted by the enlarged opening or slot 20 in the end of the lever 21. Further, any slight tipping of the rod that might remain is taken care of by the enlargement of the valve casing 5 above the valve seat, which prevents the upper end of the rod from striking the sides of the casing if it is slightly tipped or moved out of vertical alignment. Any slight misalignment that remains has practically no effect on the controlling function of the part 7 of the rod. A splash guard flange 13 is secured to the under side of the plate 11. This guard is cylindrical in form and is formed with an air slot 15 on one side. The office of this guard is to prevent any splash in the tank, caused by rough roads or speed of the machine, from being drawn up through the opening of the valve seat 9, when the valve 8 has been moved away from the seat. The fuel at such times surges back and forth and piles up against the sides of the tank and the baffle plates in the tank and works along the top of the tank to any opening. By employing the guard as shown the aperture of the valve seat 9 is guarded against this action, the air slot 15 preventing the guard acting as a suction pipe should the liquid gasoline reach the lower edge of the guard at any time. When liquid gasoline surges to a dangerous level the cork 26 is also elevated and the valve 8 brought to its seat thus closing the aperture of the valve seat 9 against the passage of any gasoline. When the tank is full as shown in Figure 1, the valve 8 is closed on the valve seat 9 and remains so until the gasoline in the tank descends past the dangerous level, when the float will draw the valve away from its seat and the controlling of the air that passes through the opening 9 will commence. Whenever the valve 8 is closed the full vacuum is built up in the casing 5 to indicate the tank is full, at the dash of the machine, as hereinafter described. It is the practice to provide the filler opening of the tank with a pendent flange 82 so that the tank cannot be completely filled but leave a slight air space above to allow for expansion. When the liquid gasoline reaches the lower edge of this flange during the filling operation, the remaining air in the top of the tank is trapped and compressed and thus prevents any further fuel being placed in the tank. This always holds the level of the liquid gasoline below the top of the tank and it is only splash that reaches the level of the valve seat 9. The location of the device in the tank is at about the middle so that the lateral tilting of the tank will have very little effect on the level of the gasoline at a point immediately below the valve seat 9. While Figure 1 of the drawings shows the device as located near the rear of the tank it will be understood that it may be located midway between the back and the front of the tank to prevent any appreciable rise in the level below the seat 9 when the car is ascending or descending hills.

An elbow 6 is secured to the upper end of the valve casing 5 and is connected by an air pipe 4 to the valve casing 44 of a testing needle valve 43. This valve is screw threaded as at 45 to screw into and out of the casing and cause its needle point 47 to seat more or less on the valve seat 48 and especially to close the valve altogether to test the full vacuum of the engine. The valve chamber 85 formed in the casing 44 communicates by port 46 with the cross pipe 39 having a vertical riser 40 and a pendent pipe 49. The riser 40 is connected by elbow 42 with an angular casting 57 fast in the casing 41 of the dash gauge and having an air passage 68 formed therein and communicating with the hollow interior of the contracting vacuum element or Bourdon tube 56 which is old and well known in the art. An arm 58 is fast to the free end of the element 56 and is pivotally connected as at 60 to a link 59 which in turn is pivotally connected as at 61 to an arm 62 pivoted on a pin 63 and provided with a gear segment 64 which meshes with a pinion 65 on the shaft 55. This shaft is journaled in the casing 41 and is provided at its outer end with an indicating hand 35 which operates over a graduated dial plate 86. A limiting pin 36 is mounted in this plate to arrest the hand 35 at its home position. It is moved to this position by the spring of the element 56 and also by an additional fine coil spring 67 anchored at one end to the shaft and at the other end to a pin 66 fast to the face plate. This gauge and its operation is a structure old and well known in the art.

A needle valve 37 similar to the valve 38 before described, is connected to the opposite end of the pipe 39 and its valve chamber is connected to the pipe 30 which in turn is connected to the manifold 69 of the engine 70, a gauze screen element 87 being interposed in the pipe to prevent any possibility of flame passing back through the pipe should the engine back fire. Ordinarily the adjustment of the valve 37 is so fine, from one to one and a half turns, as to prevent any possibility of the propagation of flame past this point should flame occur in the intake manifold.

The pendent pipe 49 is formed with a valve seat 45 upon which rests a valve 50 drawn downward by a spring 52 surrounding its stem 51. One end of this spring bears against the bottom of the pipe 49 while the opposite end is engaged by a nut 53 adjustable on the screw threaded stem 51 and locked in position by a lock nut 54. The passage through which the stem 51 passes is enlarged as at 88 so that air may freely pass the stem when the valve is open. The office of this adjustable spring drawn valve is to limit the range of the vacuum produced by the engine 70. For example if an engine produced in its manifold 18 inches of vacuum with the throttle closed the different opening positions of the throttle would decrease this vacuum in unvarying amounts. Applicant has selected for illustration in the present case an engine in which ten inches of vacuum is practically present all the time during normal running conditions, that is ten inches or more and up to 18 inches. In other words it will take an abnormal opening of the throttle to reduce the vacuum below 10 inches and with the throttle practically closed the vacuum will be 18 inches.

To set the instrument for use under these conditions the following adjustments are made.

The needle valve 38 is first closed, and the throttle of the engine is fully closed or moved to practically closed position. This adjustment would normally bring a reading of 18 inches on the gauge but this particular gauge has been set with its maximum position at ten inches of vacuum designated as "Full" on Figure 2 of the drawings. The tension of the spring 52 is now adjusted by moving the nut 53 until the hand 35 points to full (ten inches of vacuum) the surplus 8 inches of vacuum being destroyed by air entering the port normally closed by the valve 50. It will be understood that the valve 37 has been previously set at one and one half turns open or any other position desired according to the car and the conditions under which the gauge is being used. The reading of the hand 35 will now represent the maximum vacuum in inches that may be shown on the gauge when the valve 8 at the rear is seated on its seat because of the tank being practically full and the cork 26 and the rod 16 in their upper positions. The valve 38 which is simply a test valve is now opened fully and the vacuum indicated by the gauge controlled from the controlling pin 7. As the gasoline in the tank 1 is used the cork 26 descends and draws the rod 16 and the tapered controlling pin 7 downward. This allows more and more air to enter through the port of the valve seat 9 as the level of the gasoline descends and thus gradually decreases the vacuum in the gauge element 56 with the result that the hand 35 gradually moves to the left and indicates less gasoline until the final position of "Res" is reached. This position shows that a reserve of two gallons of gasoline remains, the cork being set to give this indication on the gauge before the gasoline is fully exhausted. It will of course be understood that the cork and controlling pin may be so adjusted that the tank will be empty when the extreme left position on the scale is reached.

It will also be understood that the valve 38 is not an essential part of the invention and may be omitted if desired, the test being made when the valve 8 at the rear is closed. I prefer to employ the valve, however, as the maximum vacuum of a given engine will vary according to valve conditions, wear of pistons and other causes and it is desirable to have a ready means at all times for accurately setting the instrument according to the maximum vacuum of the engine at that time. The valve 37 permits the instrument to be adjusted to operate on a minimum amount of vacuum so that the perfect operation of the engine will not be disturbed by admitting too much air to the manifold or other part from which the suction may be secured.

The valve 50 is automatic and self balancing at all times and after being once adjusted does not have to be adjusted again unless the maximum vacuum of the engine changes. This can be determined by the test above described. It will also be understood that the adjustable valve 37 may be omitted if desired. The restricted orifice of the valve 37 also prevents any flame passing it should there be a back fire in the manifold and in cases where the screen 87 is not employed.

It will be seen from the above description that by the employment of the valve 50 applicant is practically working with a constant maximum vacuum of ten inches or other selected amount such as five inches and that it is only when the vacuum in the manifold falls below the selected maximum that there is any variation and this is only momentary and is at once restored when the throttle is partly closed again. For speeds up to about 30 miles per hour on most cars, the ten inch vacuum is constantly maintained. If the throttle is opened wider for greater speed the maximum vacuum is reduced and a reading of the gauge should not be taken at this time. A momentary let up on the throttle however immediately restores the maximum vacuum and a reading may be taken. Where the maximum vacuum of an engine say is 18 inches there are times, when the throttle is suddenly closed when the car is speeding, when a greater vacuum is induced by the momentum of the car, but any such vacuum is fully taken care of by the valve 50, in fact any vacuum over 10 inches drawn or entering the passages of the gauge is destroyed by the valve 50. The range of unvarying vacuum is of course increased if the gauge is set to operate on five inches or less. When less than five inches however is employed as a maximum it is very difficult to make a commercial gauge light enough to properly register and at the same time stand the severe usage and the jolts and jars of a motor car. The valve 50 may be omitted if desired and a gauge reading taken each time by closing the throttle to its fixed closed position which will result in bringing the vacuum in the manifold to a fixed point each time and will thus give a constant reading on the gauge according to the depth of gasoline in the supply tank. I prefer to employ a maximum vacuum somewhere in the scale between five and ten inches.

I do not care to be limited to the form of controlling pin shown in the drawings as it will be apparent that many other forms of controlling devices may be employed and controlled by a float in the tank 1.

It will further be observed that by employing a vacuum to operate a commercial gauge on the dash of the machine I am enabled to accomplish the result desired by devices or by a function present in all gas engines and thus eliminate the necessity of providing mechanism for producing such a vacuum. At the same time only sufficient of the vacuum is employed to accomplish the result desired without in any wise destroying the perfect operation of the engine by introducing too much air into the manifold.

It will of course be understood that the valve 50 might be omitted but in this event the throttle of the engine would have to be closed to establish the maximum vacuum to secure a correct reading of the gauge.

Having thus described my invention what I claim as new and desire to secure by Letters Patent is:

In an automobile the combination with an engine and its intake manifold, of a fuel tank, a pressure responsive vacuum gauge for indicating the depth of fuel in the tank, a vacuum pipe connected to the manifold and the gauge, a float in the tank, an air controlling device operated by the float and connected to the vacuum pipe for regulating the flow of air to the vacuum pipe to inversely correspond to the depth of fuel in the tank.

In witness whereof, I hereunto subscribe my name this 20th day of May, A. D. 1921.

WILLIAM H. MUZZY.